(12) United States Patent
Bittner

(10) Patent No.: US 12,206,484 B2
(45) Date of Patent: Jan. 21, 2025

(54) METHOD AND SYSTEM FOR RECEPTION OF A SATELLITE DOWNLINK SIGNAL

(71) Applicant: Rohde & Schwarz GmbH & Co. KG, Munich (DE)

(72) Inventor: Steffen Bittner, Dresden (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 29 days.

(21) Appl. No.: 18/166,101

(22) Filed: Feb. 8, 2023

(65) Prior Publication Data

US 2023/0308163 A1    Sep. 28, 2023

(30) Foreign Application Priority Data

Mar. 24, 2022 (EP) .................................... 22164052

(51) Int. Cl.
   - *H04L 5/12* (2006.01)
   - *H04B 7/08* (2006.01)
   - *H04W 72/1273* (2023.01)

(52) U.S. Cl.
   CPC ...... *H04B 7/0857* (2013.01); *H04W 72/1273* (2013.01)

(58) Field of Classification Search
   CPC .......................... H04B 7/0857; H04W 72/1273
   USPC ................ 375/262, 260, 259, 219, 295, 316
   See application file for complete search history.

(56) References Cited

U.S. PATENT DOCUMENTS

| | | |
|---|---|---|
| 5,379,320 A | 1/1995 | Fernandes et al. |
| 5,898,902 A | 4/1999 | Tuzov |
| 6,493,650 B1 | 12/2002 | Rodgers et al. |
| 6,668,025 B1 | 12/2003 | Sumi et al. |

(Continued)

FOREIGN PATENT DOCUMENTS

| | | |
|---|---|---|
| DE | 3038325 A1 | 4/1982 |
| EP | 0 518 218 A1 | 12/1992 |

(Continued)

OTHER PUBLICATIONS

Ada Bosisio et al.; "Analysis and Applications of Short-Distance Site Diversity Techniques for 20/30 GHz Communication Links"; Proceedings of Globecom '95; Nov. 16, 1995; pp. 749-753.

(Continued)

*Primary Examiner* — Zewdu A Kassa
(74) *Attorney, Agent, or Firm* — Studebaker & Brackett PC

(57) ABSTRACT

Disclosed is a method (1) for reception of a satellite downlink signal (31) by a signal processor (22) in communication with a plurality of satellite signal receivers (21). The plurality of satellite signal receivers (21) is arranged in accordance with a macro diversity. The method (1) comprises: digitally sampling (11) a first satellite downlink signal received by a reference receiver (21R) of the plurality of satellite signal receivers (21) and at least one further satellite downlink signal received by at least one further receiver (21F) of the plurality of satellite signal receivers (21); and constructively combining (13) the digitally sampled first satellite downlink signal (31R) and the digitally sampled at least one further satellite downlink signal (31F). A system (2) having corresponding features is also disclosed. The methods and systems especially allow for an improvement of a signal-to-noise ratio and a reduction of an antenna size.

11 Claims, 2 Drawing Sheets

(56) References Cited

U.S. PATENT DOCUMENTS

| | | |
|---|---|---|
| 2013/0328711 A1 | 12/2013 | Fenton |
| 2014/0125520 A1 | 5/2014 | Fenton |
| 2015/0200708 A1 | 7/2015 | Yu et al. |
| 2016/0033648 A1 | 2/2016 | Overbeck |
| 2019/0123811 A1 | 4/2019 | Potter et al. |
| 2020/0028575 A1 | 1/2020 | Buer et al. |
| 2021/0058293 A1 | 2/2021 | Whitefield et al. |
| 2022/0291395 A1* | 9/2022 | Iyengar .................... H01Q 9/42 |
| 2023/0022974 A1* | 1/2023 | Fujimura ........... H04B 7/18517 |

FOREIGN PATENT DOCUMENTS

| | | |
|---|---|---|
| FR | 2 838 000 A1 | 10/2003 |
| FR | 2 863 807 A1 | 6/2005 |
| WO | 2001/097511 A1 | 12/2001 |
| WO | 2014/102797 A1 | 7/2014 |

OTHER PUBLICATIONS

"Satellite Component of UMTS/IMT2000; General Aspects and Principles; TC SES / S-UMTS; Draft ETSI TR 000054"; European Telecommunications Standards Institute (ETSI); V0.0.3; Mar. 24, 2000; pp. 1-26.

Extended European Search Report issued in EP 22164052.7—1206 by the European Patent Office on Sep. 9, 2022.

* cited by examiner

METHOD AND SYSTEM FOR RECEPTION OF A SATELLITE DOWNLINK SIGNAL

TECHNICAL FIELD

The present disclosure relates to satellite communication, and in particular to methods and systems for reception of a satellite downlink signal.

BACKGROUND ART

Today's satellite downlink communication is typically realized as single-input, single-output (SISO) communication, wherein the single output requires the antenna gain of a large antenna.

Other transmission techniques involving antenna diversity and an array gain, such as single-input, multiple-output (SIMO) or multiple-input, multiple-output (MIMO) communication, are still at their infancy in this field, as antenna diversity is especially effective at mitigating multi-path wave propagation/fading, whereas satellite downlink communication implies a line-of-sight (LOS) channel. If implemented at all, such a LOS channel in the satellite downlink is usually estimated using data-aided synchronization, based on dedicated channel information such as pilot signals or preambles.

SUMMARY

In view of the above-mentioned drawbacks and limitations of the background art, the present disclosure aims to improve a reception of satellite downlink signals, particular objectives being an improvement of a signal-to-noise ratio (SNR) and a reduction of an antenna size.

The objective is achieved by the embodiments as defined by the appended independent claims. Preferred embodiments are set forth in the dependent claims and in the following description and drawings.

A first aspect of the present disclosure relates to a method for reception of a satellite downlink signal by a signal processor in communication with a plurality of satellite signal receivers being arranged in accordance with a macro diversity. The method comprises: digitally sampling a first satellite downlink signal received by a reference receiver of the plurality of satellite signal receivers and at least one further satellite downlink signal received by at least one further receiver of the plurality of satellite signal receivers; and constructively combining the digitally sampled first satellite downlink signal and the digitally sampled at least one further satellite downlink signal.

Constructive combining as used herein may refer to a constructive interference of a plurality of signals that originate from a same source and are superimposed with each other in-phase.

The method may further comprise: digitally processing the combined satellite downlink signal.

The communication of the signal processor with the plurality of satellite signal receivers may comprise wide area network, WAN, communication.

The communication of the signal processor with the plurality of satellite signal receivers may comprise Internet Protocol, IP, based communication.

The digitally sampled first satellite downlink signal and the digitally sampled at least one further satellite downlink signal may respectively comprise a digital I/Q over IP signal.

Constructively combining the digitally sampled first satellite downlink signal and the digitally sampled at least one further satellite downlink signal may comprise: matching the digitally sampled at least one further satellite downlink signal with the digitally sampled first satellite downlink signal; and adding the digitally sampled first satellite downlink signal and the matched digitally sampled at least one further satellite downlink signal.

Matching the digitally sampled at least one further satellite downlink signal with the digitally sampled first satellite downlink signal may comprise one or more of: phase matching of the digitally sampled at least one further satellite downlink signal and the digitally sampled first satellite downlink signal, amplitude matching of the digitally sampled at least one further satellite downlink signal and the digitally sampled first satellite downlink signal, and minimizing an error of the phase matching and/or the amplitude matching using one of: a least mean squares, LMS, algorithm, a normalized least mean squares, NLMS, algorithm, a recursive least squares, RLS, algorithm, a maximum ratio combining, MRC, algorithm, and machine learning.

The machine learning may comprise supervised training of an artificial neural network.

A second aspect of the present disclosure relates to a system for reception of a satellite downlink signal. The system comprises a plurality of satellite signal receivers being arranged in accordance with a macro diversity, and being configured to: digitally sample a first satellite downlink signal received by a reference receiver of the plurality of satellite signal receivers and at least one further satellite downlink signal received by at least one further receiver of the plurality of satellite signal receivers. The system further comprises a signal processor in communication with the plurality of satellite signal receivers and being configured to: and constructively combine the digitally sampled first satellite downlink signal and the digitally sampled at least one further satellite downlink signal.

The system may further comprise a downstream processor in communication with the signal processor, being configured to digitally process the combined satellite downlink signal.

The system may further be configured to perform the method of the digitally sampled first aspect or any of its implementations.

Advantageous Effects

The present disclosure provides methods and systems for reception of a satellite downlink signal based on macro diversity and constructive signal combination.

Macro diversity of a plurality of receivers allows for replacing a large antenna by multiple smaller ones (e.g., 4×4 meters in diameter vs. 1×16 meters), which may be brought in as needed, and overcoming atmospheric communication impairments such as rainy or overcast skies.

Constructive signal combination of multiple digitally sampled instances of a same satellite downlink signal whose Gaussian noise contributions are free of mean values allows for averaging out the Gaussian noise, so that a signal-to-noise ratio (SNR) of the received satellite downlink signal increases with each additional receiver.

Such a blind (or non-data-aided) synchronization of the satellite downstream signal allows for its reception regardless of any dedicated channel information such as pilot signals or preambles and irrespective of the underlying waveform.

The technical effects and advantages described above equally apply to the methods and systems for reception of a satellite downlink signal having corresponding features.

BRIEF DESCRIPTION OF DRAWINGS

The above-described aspects and implementations will now be explained with reference to the accompanying drawings, in which the same or similar reference numerals designate the same or similar elements.

The features of these aspects and implementations may be combined with each other unless specifically stated otherwise.

Figure 1:
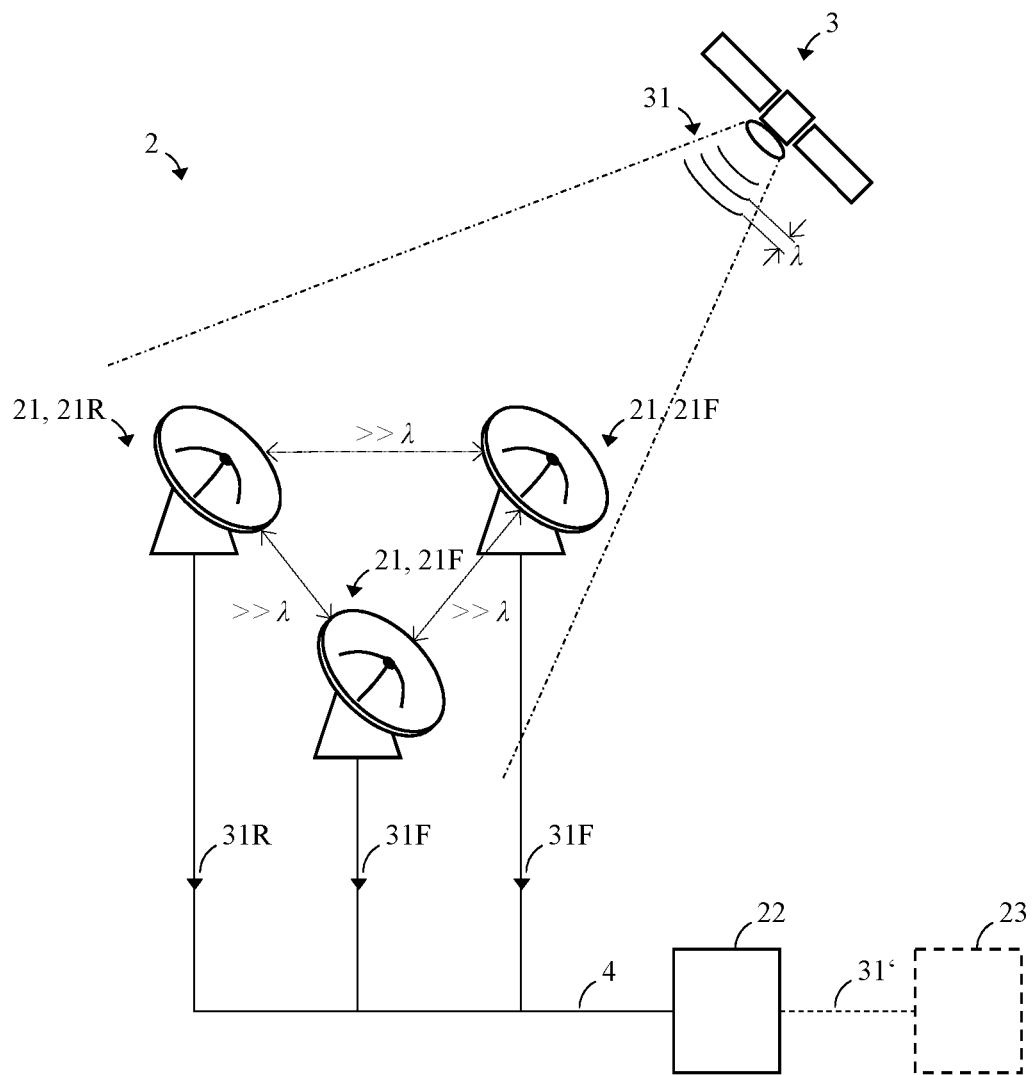

The drawings are to be regarded as being schematic representations, and elements illustrated in the drawings are not necessarily shown to scale. Rather, the various elements are represented such that their function and general purpose become apparent to those skilled in the art.

Figure 2:
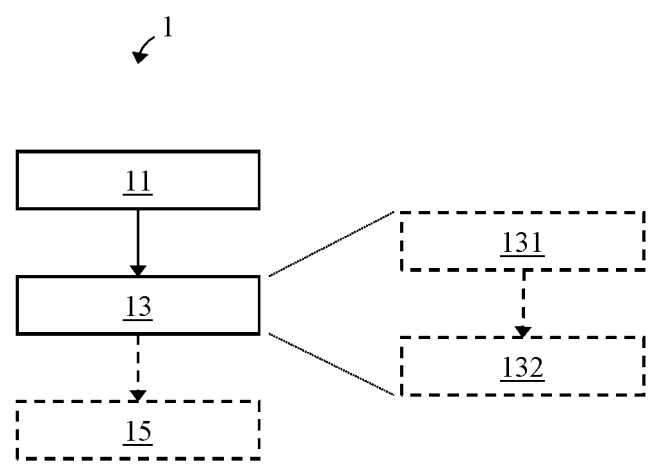

FIG. 1 illustrates a system for reception of a satellite downlink signal in accordance with the present disclosure; and FIG. 2 illustrates a method for reception of a satellite downlink signal in accordance with the present disclosure.

DETAILED DESCRIPTIONS OF DRAWINGS

FIG. 1 illustrates a system 2 for reception of a satellite downlink signal 31 in accordance with the present disclosure.

The satellite downlink signal 31 to be received is transmitted earthward by a satellite 3 on a particular carrier wavelength $\lambda$.

The system 2 comprises a plurality of satellite signal receivers 21 being arranged with respect to one another in accordance with a macro diversity. In FIG. 1, a plurality of three satellite signal receivers 21 is exemplified.

Macro diversity as used herein may refer to an antenna diversity scheme using a plurality of receivers/antennas for transmitting a same satellite downlink signal. A distance or spacing between the receivers may be much longer than, e.g. at least 10 times, preferably at least 100 times, more preferably at least 1.000 times the carrier wavelength $\lambda$ of the satellite downlink signal, as opposed to micro diversity where said distance or spacing is in the order of or shorter than the carrier wavelength $\lambda$. For example, the plurality of receivers may be set up in different geographic locations, such as e.g. in different cities.

As may be taken from FIG. 1, each of the plurality of receivers 21 may comprise an antenna, and may further comprise a radio frontend circuit up to and including an analog-to-digital converter (ADC). As such, the respective receiver 21 may be configured to perform reception of a respective instance of the satellite downlink signal 31 after exposure to a respective LOS channel, and to digitally sample 11 a respective instance of the satellite downlink signal 31.

An antenna as used herein may generally refer to a device designed for conversion between waveguide-bound communication and wireless communication, in both ways. For satellite communication, a dish-shaped type of parabolic antennas known as satellite dish may be used, for example.

A radio frontend circuit as used herein may refer to all the circuitry of a radio receiver between its antenna and its digital signal processing (DSP). In some receiver architectures, the radio frontend circuit converts the received signal to an intermediate frequency (IF) where it is digitized, sampled and converted to a binary digital form. Subsequent IF filtering and demodulation may be left to digital signal processing. For satellite communication, a low-noise block downconverter (LNB) which may be arranged in front of a dish reflector of a satellite dish may serve as the radio frontend circuit.

A line-of-sight (LOS) as used herein may refer to a direct visual axis between a transmitter and a receiver.

The system 2 further comprises a signal processor 22 in communication with the plurality of satellite signal receivers 21. For example, the signal processor 22 may comprise a central processing unit (CPU), a field-programmable gate array (FPGA) circuit, an application-specific integrated circuit (ASIC), a digital signal processor (DSP), a graphics processing unit (GPU), or a computing system comprising any of the above.

The communication of the signal processor 22 with the plurality of satellite signal receivers 21 may comprise wide area network, WAN 4, communication, and in particular Internet Protocol, IP, based communication.

The system 2 may be configured to perform the method 1 of the first aspect or any of its implementations (see FIG. 2 below for details).

In a broadest implementation of the system 2, the plurality of satellite signal receivers 21 is configured to digitally sample 11 a first satellite downlink signal received by a reference receiver 21R of the plurality of satellite signal receivers 21 and at least one further satellite downlink signal received by at least one further receiver 21F of the plurality of satellite signal receivers 21.

In other words, the satellite downlink signal 31 to be received is simultaneously sampled at different locations to yield a digitally sampled first satellite downlink signal 31R and a digitally sampled at least one further satellite downlink signal 31F.

The digitally sampled first satellite downlink signal 31R and the digitally sampled at least one further satellite downlink signal 31F may respectively comprise a digital I/Q over IP signal.

The signal processor 22 is configured to constructively combine 13 the digitally sampled first satellite downlink signal 31R and the digitally sampled at least one further satellite downlink signal 31F.

As indicated by dashed lines in FIG. 1, the system 2 may further comprise a downstream processor 23 in communication with the signal processor 22, being configured to digitally process 15 the combined satellite downlink signal 31'. Just like the signal processor 22, the downstream processor 23 may comprise a CPU, FPGA, ASIC, DSP, GPU, or a computing system comprising any of the above.

FIG. 2 illustrates a method 1 for reception of a satellite downlink signal 31 in accordance with the present disclosure.

Just like the system 2 described above, the method 1 involves a signal processor 22 in communication with a plurality of satellite signal receivers 21.

The communication of the signal processor 22 with the plurality of satellite signal receivers 21 may comprise wide area network, WAN 4, communication, and in particular Internet Protocol, IP, based communication.

The plurality of satellite signal receivers 21 is arranged in accordance with a macro diversity.

In its broadest implementation, the method 1 comprises digitally sampling 11 and constructively combining 13 steps, being illustrated in FIG. 2 using solid lines.

First, the method 1 comprises digitally sampling 11 a first satellite downlink signal received by a reference receiver 21R of the plurality of satellite signal receivers 21 and at least one further satellite downlink signal received by at least one further receiver 21F of the plurality of satellite signal receivers 21.

The digitally sampled first satellite downlink signal 31R and the digitally sampled at least one further satellite downlink signal 31F may respectively comprise a digital I/Q over IP signal.

Then, the method 1 comprises constructively combining 13 the digitally sampled first satellite downlink signal 31R and the digitally sampled at least one further satellite downlink signal 31F.

Constructively combining 13 the digitally sampled first satellite downlink signal 31R and the digitally sampled at least one further satellite downlink signal 31F may comprise: matching 131 the digitally sampled at least one further satellite downlink signal 31F with the digitally sampled first satellite downlink signal 31R; and adding 132 the digitally sampled first satellite downlink signal 31R and the matched digitally sampled at least one further satellite downlink signal 31F.

In turn, matching 131 the digitally sampled at least one further satellite downlink signal 31F with the digitally sampled first satellite downlink signal 31R may comprise one or more of: phase matching of the digitally sampled at least one further satellite downlink signal 31F and the digitally sampled first satellite downlink signal 31R, amplitude matching of the digitally sampled at least one further satellite downlink signal 31F and the digitally sampled first satellite downlink signal 31R, and minimizing an error of the phase matching and/or the amplitude matching using one of: a least mean squares, LMS, algorithm, a normalized least mean squares, NLMS, algorithm, a recursive least squares, RLS, algorithm, a maximum ratio combining, MRC, algorithm, and machine learning. Any of the above may be implemented by digital signal processing.

The machine learning may comprise supervised training of an artificial neural network (ANN). For example, the supervised training may be based on inputs (at least portions of the digitally sampled first satellite downlink signal 31R and the digitally sampled at least one further satellite downlink signal 31F) and a desired output (filter coefficients of an LMS filter known to achieve an improvement in analog signal quality of the resulting satellite downlink signal 31', such as an SNR, for example).

Optionally, the method 1 may further comprise: digitally processing 15 the combined satellite downlink signal 31', such as a satellite communication system, a mobile communication system, or the like. For example, the combined satellite downlink signal 31' may be received using a matched filter.

The invention claimed is:

1. A method for reception of a satellite downlink signal by a signal processor in communication with a plurality of satellite signal receivers being arranged in accordance with a macro diversity, the method comprising:
digitally sampling a first satellite downlink signal received by a reference receiver of the plurality of satellite signal receivers and at least one further satellite downlink signal received by at least one further receiver of the plurality of satellite signal receivers; and
constructively combining the digitally sampled first satellite downlink signal and the digitally sampled at least one further satellite downlink signal,
wherein a distance or spacing between the satellite signal receivers is longer than at least 10 times a carrier wavelength of the satellite downlink signal.

2. The method of claim 1, further comprising
digitally processing the combined satellite downlink signal.

3. The method of claim 1,
the communication of the signal processor with the plurality of satellite signal receivers comprising wide area network, WAN, communication.

4. The method of claim 3,
the communication of the signal processor with the plurality of satellite signal receivers comprising Internet Protocol, IP, based communication.

5. The method of claim 1,
the digitally sampled first satellite downlink signal and the digitally sampled at least one further satellite downlink signal respectively comprising a digital I/Q over IP signal.

6. The method of claim 1,
constructively combining the digitally sampled first satellite downlink signal and the digitally sampled at least one further satellite downlink signal comprising:
matching the digitally sampled at least one further satellite downlink signal with the digitally sampled first satellite downlink signal; and
adding the digitally sampled first satellite downlink signal and the matched digitally sampled at least one further satellite downlink signal.

7. The method of claim 6,
matching the digitally sampled at least one further satellite downlink signal with the digitally sampled first satellite downlink signal comprising one or more of:
phase matching of the digitally sampled at least one further satellite downlink signal and the digitally sampled first satellite downlink signal,
amplitude matching of the digitally sampled at least one further satellite downlink signal and the digitally sampled first satellite downlink signal, and
minimizing an error of the phase matching and/or the amplitude matching using one of:
a least mean squares, LMS, algorithm,
a normalized least mean squares, NLMS, algorithm,
a recursive least squares, RLS, algorithm,
a maximum ratio combining, MRC, algorithm, and
machine learning.

8. The method of claim 7,
the machine learning comprising supervised training of an artificial neural network.

9. A system for reception of a satellite downlink signal, comprising:
a plurality of satellite signal receivers being arranged in accordance with a macro diversity, wherein a distance or spacing between the satellite signal receivers is longer than at least 10 times a carrier wavelength of the satellite downlink signal, and configured to:
digitally sample a first satellite downlink signal received by a reference receiver of the plurality of satellite signal receivers and at least one further satellite downlink signal received by at least one further receiver of the plurality of satellite signal receivers; and
a signal processor in communication with the plurality of satellite signal receivers, and configured to constructively combine the digitally sampled first satellite downlink signal and the digitally sampled at least one further satellite downlink signal.

10. The system of claim 9, further comprising
a downstream processor in communication with the signal processor, being configured to digitally process the combined satellite downlink signal.

11. The system of claim 9, being configured to perform the steps of:
- digitally sampling a first satellite downlink signal received by a reference receiver of the plurality of satellite signal receivers and at least one further satellite downlink signal received by at least one further receiver of the plurality of satellite signal receivers; and
- constructively combining the digitally sampled first satellite downlink signal and the digitally sampled at least one further satellite downlink signal.

* * * * *